United States Patent [19]

Slatton

[11] 4,438,585
[45] Mar. 27, 1984

[54] INSECT EXTERMINATING DEVICE

[75] Inventor: B. Dale Slatton, Sheridan, Ill.

[73] Assignee: Ernest Kettelson, Joliet, Ill. ; a part interest

[21] Appl. No.: 339,942

[22] Filed: Jan. 18, 1982

Related U.S. Application Data

[63] Continuation-in-part of Ser. No. 242,751, Mar. 11, 1981, abandoned, which is a continuation of Ser. No. 89,842, Oct. 10, 1979, abandoned.

[51] Int. Cl.$^3$ .................... A01M 01/04; A01M 01/06
[52] U.S. Cl. ........................................ 43/113; 43/139; 43/132.1
[58] Field of Search ...................... 43/44.98, 107, 111, 43/113, 132 R, 138, 139

[56] References Cited

U.S. PATENT DOCUMENTS

| | | | |
|---|---|---|---|
| 2,778,150 | 1/1957 | Pohlmon | 43/113 |
| 2,799,117 | 7/1957 | Stokes et al. | 43/113 |
| 3,063,189 | 11/1962 | Keller | 43/44.98 |
| 4,251,945 | 2/1981 | Tasma | 43/113 |
| 4,282,673 | 11/1981 | Focks et al. | 43/113 |

Primary Examiner—Nicholas P. Godici
Assistant Examiner—M. Jordan
Attorney, Agent, or Firm—Ernest Kettelson

[57] ABSTRACT

An insect exterminating device comprising a bowl shaped container having a shaft centrally disposed extending upwardly, the shaft being rapidly rotated by an electric motor at a representative speed range of between 1,200 and 3,000 rpm, the shaft having a disc secured to its upper end region but positioned below the plane of the rim of the container, and a flexible nylon cord extending radially outwardly from opposite sides of the disc. As the shaft rotates, the nylon cord is extended reaching from the center of the container to approximately the peripheral wall, the rotation being rapid enough to strike and kill insects such as flies which enter the container, attracted therein by bait placed on the bottom. When the shaft is not rotating, the flexible cord lies limp. The bait may consist of molasses mixed with various types of feed, or any edible material which attracts insects preferably containing sugar, honey or other sweet ingredient. The flexible nylon cord is rotated rapidly enough so that it is invisible to the insects as they fly into the container in an attempt to reach the bait. The motor includes a thermal limit switch to enable it to operate intermittently, automatically starting and stopping for desired preselected intervals. When stopped, insects fly into the container to reach the bait and are then struck by the rotating cord when the motor re-starts to again rotate the nylon cord at which time the insects attempt to escape. The nylon cord may be coated with phosphorescent paint to glow in the dark as it rotates, thereby serving as a means in itself to attract insects.

7 Claims, 7 Drawing Figures

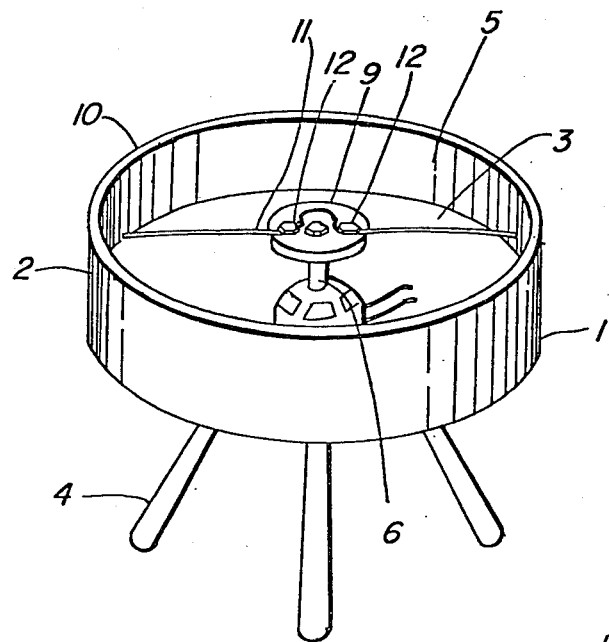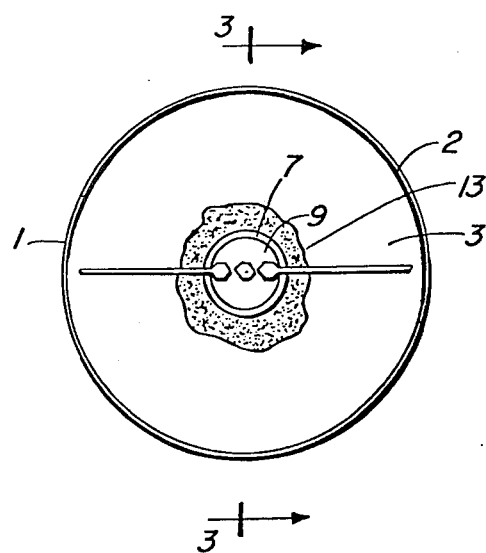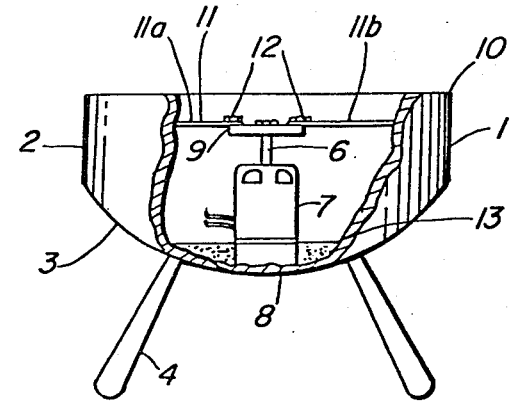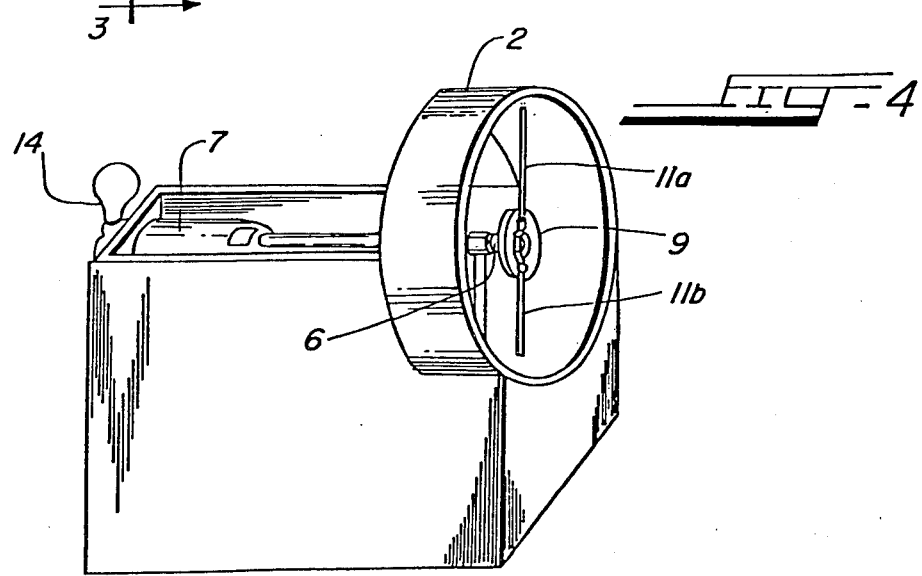

INSECT EXTERMINATING DEVICE

BACKGROUND OF THE INVENTION

This application is a continuation-in-part of application Ser. No. 242,751 now abandoned, filed Mar. 11, 1981, which is a continuation of abandoned Ser. No. 89,842 filed Oct. 10, 1979.

This invention relates to the field of insect exterminating devices having moving parts which stroke or otherwise contact the insects to exterminate them in that way as distinguished from devices which utilize electrocution, poison and other methods of extermination.

Presently known insect exterminating devices of the self-propelled or powered mechanical type which rely on contact with the insect for extermination are cumbersome and complex. Some devices of this type utilize a propeller which may be wind driven connected to a drive mechanism which rotates a rotor against a planar surface to crush insects which are crawling across a planar surface to reach bait on the other side. Obviously such devices would not affect insects which are able to fly over the planar surface to reach the bait. Other devices of this kind include rapidly rotating impellers which create an air flow and suction which draws insects into a chamber on one side of the impeller and are then blown through an exhaust chute into a collector bag or other container on the other side of the impeller for eventual disposal. There are a number of other variations of this type of mechanical insect exterminating device which rely on rotating propellers, impellers and the like to either drive an insect exterminating device, or which create an air flow that catches insects and eventually directs to some sort of disposal chamber or container. Devices of this type besides being complex and expensive are also dangerous because of the rapidly rotating propellers or impellers which are usually of metal or other relatively rigid material. A further disadvantage of prior art devices of this type is that they are not particularly effective since their moving parts are readily visible to the insects and tend to warn them of potential danger.

The present invention is very simple and relatively inexpensive to manufacture and produce, the operative contact element consisting only of a length of flexible nylon cord. This invention also overcomes the disadvantage of prior art devices of this type which are relatively dangerous in that if a person inadvertently touches the rapidly rotating flexible cord, the likelihood of injury is relatively small. Furthermore, the rapidly rotating flexible cord is virtually invisible to insects as they approach the bait. The flexible nylon cord is preferably unstressed and not pre-stretched, to retain the relatively larger cross-section of the original unstressed and unstretched length of cord thereby providing a relatively thicker cord and greater striking surface throughout the length of the cord to strike and kill insects than would be the case with a stressed or pre-stretched cord. A relatively thick unstressed cord may not extend from the shaft around which it rotates as close to a right angle as a thin pre-stretched and stressed cord having a reduced diameter. However, while that is critically important for such devices as grass cutter, lawn mowers and the like to get an even cut, it is desirable for insect exterminating devices to have a relatively thick unstretched and unstressed cord having an increased diameter to provide greater surface area to strike and kill rapidly moving insects as they attempt to fly through the rapidly rotating cord. Also, it is not necessary for the cord to rotate entirely in a plane that intersects the shaft at a right angle. The distal free end of the cord and intermediate portions of the cord may be above or below such plane, to rotate in a zone of rotation rather than a plane of rotation. In this way there is a definable distance or zone through which insects have to fly in which they are subject to being struck and killed by one of the rapidly rotating cords, rather than one single plane.

The exterminating device in accordance with this invention does not require a protective frame, screen or other enclosure in front of the rapidly rotating nylon cord, which if present, would impede the entrance of insects into the container to reach the bait placed on the bottom.

SUMMARY OF THE INVENTION

It is an object of the invention to provide an insect exterminating device of relatively simple and uncomplicated design, and inexpensive to make which is at the same time more effective in accomplishing the object of exterminating insects.

It is an object of the invention to provide an insect exterminating device comprising a length of flexible cord rapidly rotating in a container above insect attracting bait placed on the bottom of the container, the rapidly rotating flexible cord striking and killing the insects as they attempt to move past the rapidly rotating cord to get at the bait It is an object of the invention to provide an insect exterminating device comprising a bowl shaped container having an upwardly extending annular side wall, a shaft projecting upwardly from the center of the container, a flexible cord secured to the shaft extending radially outward in diametrically opposite directions when the shaft is rapidly rotating, the rotation being rapid enough to cause the flexible cord to extend outwardly from the shaft at an angle which substantially approaches a right angle to the shaft, the shaft being rotated by an electric motor, the flexible cord being rotated in a zone of rotation which is below the rim of the annular wall around the container.

It is an object of the invention to provide an insect exterminating device comprising a flexible cord rapidly rotated by an electric motor which automatically starts and stops for alternating intervals of a relatively brief pre-determined duration.

It is an object of the invention to provide an insect exterminating device comprising a flexible cord rapidly rotated by an electric motor in which the flexible cord is coated with phosphorescent material to glow in the dark as it is rotated to thereby serve to attract insects toward such rapidly rotating cord.

BRIEF DESCRIPTION OF THE DRAWINGS

FIG. 1 is a perspective view of an insect exterminating device in accordance with this invention.

FIG. 2 is a top plan view of the insect exterminating device shown in FIG. 1.

FIG. 3 is a section view taken on line 3—3 of FIG. 2.

FIG. 4 is a perspective view of a modified form of the insect exterminating device in accordance with the invention in which the rotating element is positioned to rotate in a vertical plane.

DESCRIPTION OF PREFERRED EMBODIMENT

Figure 5:
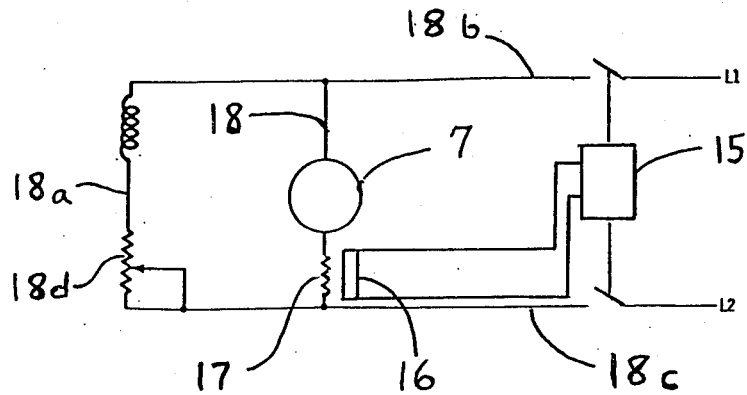
FIG. 5 is a schematic view showing the electrical circuit of the motor in accordance with this invention having a thermal limit switch component connected therein to alternately start and stop the electric motor for pre-determined intervals.
Figure 6:
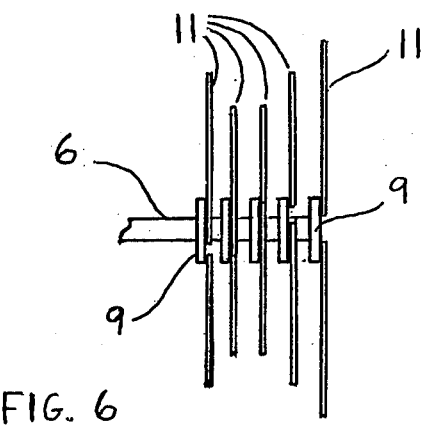
FIG. 6 is a side elevation view of a portion of a modification of this invention, showing an elongated or extended drive shaft of the electric motor on which a plurality of flexible cords are secured in spaced apart relationship.
Figure 7:
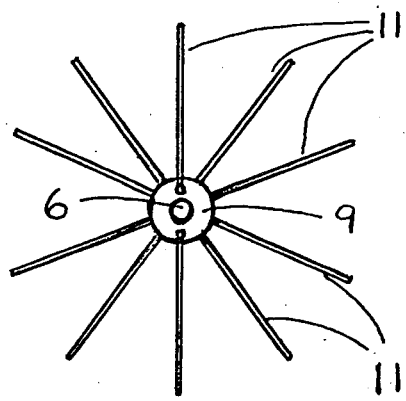
FIG. 7 is an elevation view from the front of the portion of the modification shown in FIG. 6.

An insect exterminating device in accordance with this invention includes a container 1, which is preferably bowl shaped and includes an outwardly extending peripheral annular wall 2, and a concave bottom wall 3. The container may be supported on legs 4 with the open top wall 5 lying in a horizontal plane. The open wall 5 may however by mounted in a vertical plane in an opening provided in the wall of a building, or it may be mounted on a free standing container or other supporting frame in a vertical plane.

A drive shaft 6 extends upwardly in the center of the container 1. The drive shaft 6 is connected to a rotating power source such as an electric motor 7, which may be mounted inside of the container resting on the bottom or on a base 8 placed in the center of the bottom wall 3 of the container 1. The motor 7 and base 8 are secured to the bottom wall 3 by conventional means such as rivets or bolts. An appropriate electric motor to operate the insect exterminating device of this invention is a 1/60 hp electric motor having a speed range of between 1,200 rpm and up to 3,000 rpm. An ideal operating speed for operation of this invention is in the area of 1,500 rpm. The electric motor chosen for this purpose should preferably be self cooling and include a fan, particularly if mounted within the container 1 where it will eventually become surrounded and partially covered by dead insects as they are killed and begin to accumulate in the container.

A mounting disc 9 is secured to the drive shaft 6 at a point thereon which is below the plane of the rim 10 of the peripheral wall 2 of the container 1. A flexible cord 11 is secured to the mounting disc 9 by means of screws 12. The flexible cord 11 may be one single length which extends diametrically across the container 1 from near the peripheral wall 2 on one side to near the directly opposite side of peripheral wall 2, the opposite ends of the flexible cord 11 terminating just short of the peripheral wall 2 to provide clearance for the flexible cord 11 as it is rotated by the drive shaft 6. The flexible cord 11 may also consist of two separate flexible cords designated as 11a and 11b, each section extending radially outwardly in opposite directions from the mounting disc 9 and terminating just short of the peripheral wall 2 when fully extended by rapid rotation of the drive shaft 6.

The flexible cord 11 is preferably a nylon cord, but it is within the scope of this invention to include any type of flexible cord. One characteristic of the flexible cord 11 in accordance with this invention is that it becomes extended at an angle which substantially approaches a right angle to the drive shaft 6 when rapidly rotated at the appropriate speed. Such speed may vary depending on the type of flexible cord used, the appropriate speed of rotation being that which causes the flexible cord to extend from the drive shaft at said angle when rotated at such speed. The appropriate speed of rotation for the embodiment described herein and shown in the drawings, in which nylon cord is used, is between 1,200 rpm and 3,000 rpm. An ideal speed of rotation is in the range of 1,500 rpm.

The nylon or other flexible cord 11 is preferably not pre-stretched, and not stressed, but rather in its original condition whereby it has a relatively thicker diameter and greater exterior surface for striking insects throughout the length of the cord than would be the case with a stressed and pre-stretched cord which results in a much thinner, reduced diameter cord. The latter is desirable for lawn mowers, grass cutters and the like, which require a cord which will rotate in a single plane substantially perpendicular to the rotating shaft. Otherwise, it would not be possible to get a flat even cut on a lawn. Also, a thin cord is desirable for cutting grass or weeds because the thinner the cord, the sharper the cutting edge. However, for use in the insect exterminator of this invention, a relatively thicker cord having a greater exterior surface to strike and kill bugs, and which rotates in a zone of rotation rather than a single plane, is desired. The distal free end of the cord 11, and intermediate portions thereof may be above, or below, or otherwise out of the plane normal to the shaft 6 in which the most inwardly portions of the cord 11 rotate. If for example, the outer end of cord 11 is displaced one inch :rom such pane, there ia then a zone of rotation having a depth of one inch through which insects must fly in which they may be struck by a portion of either cord 11a or 11b as the cord is rapidly rotated.

Insect attracting bait 13 is placed in the bottom of the container 1 to attract flies and other insects into the container. Such bait may consist of molasses mixed with other types of food for which insects have a preference. Other food materials containing sugar, honey and the like are effective for use as bait in this invention. The bait for use in accordance with this invention does not have to be poisonous or have other exterminating characteristics in itself.

In operation, after an appropriate insect bait has been placed in the bottom of container 1, the electric motor 7 is actuated causing the drive shaft 6 to rotate at a speed in the preferable range of 1,500 rpm. At such speed the flexible cord 11 becomes extended at an angle which substantially approaches a right angle to the drive shaft 6, and since it is secured to the mounting disc 9 which is below the plane of the rim 10 of the container 1, the flexible cord 11 rotates in a zone of rotation within the container 1 below the rim 10 of peripheral wall 2. The insects become attracted to the bait 13 in the bottom of the container 1. They have to pass through the rapidly rotating flexible cord 11, which at such speed of rotation is not visible to the insects as they approach the bait. The speed of rotation of flexible cord 11 is sufficient however to strike and kill the insects as they attempt to pass through to reach the bait 13. The dead insects drop into the bottom of the container 1, and dead insects themselves become attractive bait to attract other insects into the insect exterminating device.

When the flexible cord 11 is mounted to rotate in a vertical plane, other types containers may be used to hold the bait in position behind the rapidly rotating flexible cord to attract the insects thereto. Other types of bait may also be used, such as a light from electric bulb 14 positioned behind the rapidly rotating flexible cord as shown in the modification illustrated in FIG. 4.

The flexible cord 11 is mounted to rotate below the plane of the rim 10 of the container 1 to prevent insects struck by the rapidly rotating cord from being flung outwardly of the container. By mounting below the rim, insects which are struck and flung outwardly by the rapidly rotating flexible cord 11 hit the peripheral wall 2 and drop to the bottom 3 of the container 1.

The flexible cord 11 used in this invention being unstressed and not pre-stretched has a larger diameter than similar and like cords which are stretched and stressed, thereby reducing the risk that a person's finger or hand might be cut if it comes into contact with the rapidly rotating cord 11, or cords 11a and 11b. The thicker the cord, the duller the cutting edge and cutting effect as far as safety of people using the device is concerned. Due to the greater mass of said unstressed cord 11, and cords 11a and 11b, the outer free ends thereof tend to droop somewhat when rotated in a horizontal zone of rotation whereby the outer free ends rotate in one plane which is perpendicular to the drive shaft 6 while the innermost ends or portions innermost and closest to their connection to drive shaft 6 rotate in a second plane which is perpendicular to the drive shaft 6, the second plane being spaced apart from the first to define therebetween a zone of rotation in which the said cord 11 or cords 11a and 11b rotate.

The electric motor 7 includes a thermal limit switch component 15, comprising a thermocouple unit 16 mounted in close proximity to a 15 Ohm 10 Watt resistor 17 connected in series with the armature winding 18 of the motor 7. The motor illustrated in the schematic drawing of FIG. 5 is of the shunt wound D.C. type for purposes of illustration, although a resistor 17 can be connected in the winding of any type electric motor to provide the desired temperature rise. The field winding o1 the shunt motor illustrated is designated by the reference No. 18a, and the conductors leading to an electrical source are designated 18b and 18c. The field resistance is designated by 18d.

The thermocouple 16 senses the temperature rise of resistor 17 whereupon at a preselected temperature it causes the thermal limit switch 15 to open thereby interrupting the source of electric power to the electric motor 7 causing it to stop. A preferred preselected temperature of resistor 17 is about 140 degrees Fahrenheit.

As the resistor cools down to a desired re-start temperature, for example 100 degrees Fahrenheit, the thermocouple unit 16 causes the thermal limit switch 15 to close, thereby again completing the circuit to electric motor 7 from the electric power source.

When the motor 7 stops, the flexible cord 11 ceases to rotate. Insects can then reach the bait 13 in the bottom of the container 1. By the time the thermocouple unit 16 cools enough to close the limit switch 15 causing the motor 7 to restart and flexible cord 11 to again rotate rapidly, a substantial number of insects will be trapped in the container 1 and struck by the rapidly rotating cord 11 when they try to fly past its zone of rotation and escape from the container 1.

In a modification of this invention, the flexible cord 11 may be coated with phosphorescent material or other material which glows in the dark, or reflective material which reflects light directed thereon from a remote light source. Thus, when the flexible cord 11 coated with such material is rotated by the motor 7 during house and places of darkness, it glows or reflects and thereby provides a light source or lighted target which itself serves to attract insects toward and past the rapidly rotating cord 11 whereby they are struck and killed.

In a further modification of this invention, a plurality of flexible cords 11 are mounted in spaced apart relationship on an elongated or extended drive shaft 6 of motor 7, which rotate in spaced apart zones of rotation when shaft 6 is driven by motor 7. Thus, insects which escape the outermost flexible cord 11 rotating in the outermost zone of rotation, may be struck and killed by one of the next inwardly spaced cords 11 rotating in a next inwardly spaced zone of rotation. The respective cords 11 are attached to drive shaft 6 in such a way that each preferably intersects drive shaft 6 at a different point on its circumference, i.e. at a different degree location around the circumference of said drive shaft 6.

I claim:

1. An insect exterminating device, comprising support means, a length of flexible material supported by said support means for rotation in a first annular zone of rotation, intermittent rotary drive means to rotate said length of flexible material in said first annular zone of rotation for a pre-determined period of time, then stop rotation for a predetermined period of time, and then re-start rotation for a pre-determined period of time, wherein said intermittent rotary drive means includes an electric motor, thermal means operatively associated with said motor to provide a temperature rise of a pre-determined amount after a pre-determined period of time of operation of said motor, and stitch means operatively associated with said thermal means to sequentially disconnect said motor from its power source when said pre-determined temperature rise is reached and reconnect said motor to its power source when said temperature has lowered to a pre-determined pre-existing level.

2. An insect exterminating device as set forth in claim 1, herein said thermal means includes a resistor connected in the winding of said electric motor to provide said temperature rise of a pre-determined amount after a pre-determined period of time oi operation of said motor.

3. An insect exterminating device as set forth in claim 2, wherein said switch means includes a temperature actuated stitch connected between said electric motor and a said power source, said temperature actuated switch being mounted in close proximity to said resistor to sense when said resistor has reached said temperature rise of said pre-determined amount to thereupon open the circuit between said motor and its said power source, said temperature actuated switch also sensing when the temperature of said resistor has returned to a lower pre-determined level to thereupon close the said circuit between said motor and its said power source.

4. An insect exterminating device, comprising support means, a length of flexible material supported by said support means or rotation in a first annular zone of rotation, rotary drive means to rotate said flexible material in said first annular zone of rotation, wherein the surface of said length of flexible material includes a substance thereon which emits light therefrom, whereby said length of flexible material when rotated provides a visible light means to attract insects to and past said length of flexible material while being rotated by said rotary drive means.

5. An insect exterminating device as set forth in claim 4, wherein said length of flexible material is a length of nylon cord.

6. An insect exterminating device as set forth in claim 4, wherein said substance which emits light therefrom is a phosphorescent material.

7. An insect exterminating device as set forth in claim 4, wherein said substance which emits light therefrom is a reflective material.

* * * * *